United States Patent [19]

Hammerl et al.

[11] Patent Number: 5,671,873
[45] Date of Patent: Sep. 30, 1997

[54] PROPORTIONING APPARATUS FOR VISCOUS MATERIALS

[75] Inventors: Norbert Hammerl, Petershausen; Horst Fleischer, Dachau, both of Germany

[73] Assignee: Ludwig Schwerdtel GmbH, Karlsfeld, Germany

[21] Appl. No.: 558,280

[22] Filed: Nov. 13, 1995

[30] Foreign Application Priority Data

Nov. 11, 1994 [DE] Germany .................. 44 40 243.0

[51] Int. Cl.$^6$ ...................................... B67D 5/40
[52] U.S. Cl. .................... 222/309; 222/333; 222/380
[58] Field of Search .................... 222/249, 250, 222/309, 333, 380, 404; 74/39, 44

[56] References Cited

U.S. PATENT DOCUMENTS

| | | | |
|---|---|---|---|
| 3,173,584 | 3/1965 | Giavasis | 222/404 |
| 3,439,835 | 4/1969 | Reid | 222/250 |
| 3,653,545 | 4/1972 | Tanner | 222/250 |
| 4,234,107 | 11/1980 | Gernlein | 222/309 |
| 4,396,385 | 8/1983 | Kelly et al. | |
| 4,526,032 | 7/1985 | Huster | |

FOREIGN PATENT DOCUMENTS

| | | | |
|---|---|---|---|
| 1 140 121 | 8/1960 | Germany | 141/116 |
| 2077230 | 12/1981 | United Kingdom | |
| 2181493 | 4/1987 | United Kingdom | |
| 2192859 | 1/1988 | United Kingdom | |

*Primary Examiner*—Philippe Derakshani
*Attorney, Agent, or Firm*—Browdy and Neimark

[57] ABSTRACT

A proportioning apparatus for viscous materials comprises a proportioning cylinder which has an inlet and an outlet. The proportioning cylinder houses a delivery piston actuable by way of an actuating rod. The latter is drivable by an electric motor, which is connected with the actuating rod by way of a crank drive.

10 Claims, 1 Drawing Sheet

U.S. Patent
Sep. 30, 1997
5,671,873
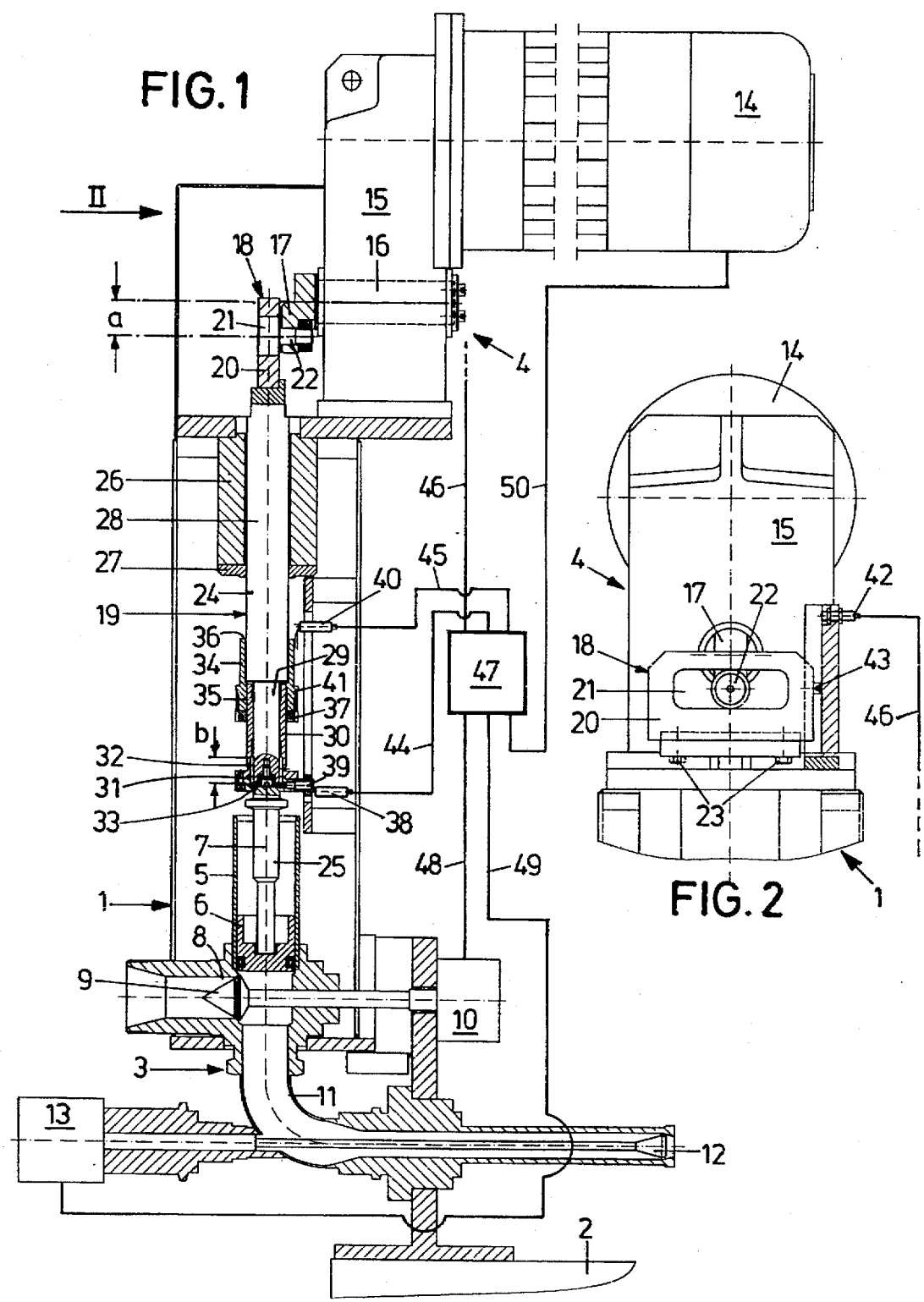

PROPORTIONING APPARATUS FOR VISCOUS MATERIALS

BACKGROUND OF THE INVENTION

1. Field of the Invention

The invention relates to a proportioning apparatus for highly viscous materials.

2. Background Art

Proportioning apparatuses of the generic type are known, comprising a proportioning cylinder with an inlet and an outlet. The inlet can be closed by an inlet valve, while the outlet can be closed by an outlet valve. A delivery piston, which is floatingly disposed in the proportioning cylinder, can be actuated in the direction of delivery by the piston rod of a pneumatically or hydraulically operable piston-cylinder drive. Owing to their inertia, proportioning drives of this type cannot be used for high proportioning-cycle sequences of for instance at least 35 proportioning operations per minute. In addition, the pneumatic or hydraulic drives exhibit strong accelerations at the start and the end of a delivery stroke, because they accelerate to full delivery speed in an extremely short time and they brake to standstill from this delivery speed in an extremely short time. As a result, sudden pressure increases occur in the filling machines disposed downstream of the proportioning apparatuses and are imparted to the cartridges to be filled.

SUMMARY OF THE INVENTION

It is the object of the invention to embody a proportioning apparatus which ensures a high proportioning performance without any sudden pressure increases occurring.

This object is attained by a proportioning apparatus for viscous materials comprising a frame, a proportioning cylinder mounted on the frame and having an inlet and an outlet, a delivery piston disposed in the proportioning cylinder displaceably along the latter's central longitudinal axis, an inlet valve for closing and opening the inlet, an outlet valve for closing and opening the outlet, a proportioning drive with an actuating rod displaceable in the direction of the central longitudinal axis and movable into delivering contact with the delivery piston, and with an electric motor coupled with the actuating rod by way of a crank drive. An electric motor with a crank drive performs one proportioning operation per revolution of the crank drive. The performance can be a lot higher than is possible with pneumatically or hydraulically actuated piston-cylinder drives. Extraordinarily smooth running is achieved, the movement pattern of the actuating rod being sinusoidal, i.e. there is soft acceleration at the start of the delivery operation and soft braking at the end so that even with high proportioning-cycle sequences, unfavorable sudden pressure increases do not occur in the filling machines or installations.

Especially advantageous possibilities of control consist in that a first switch closing the outlet valve and opening the inlet valve is associated with the proportioning drive, in that a a second switch closing the inlet valve and opening the outlet valve is associated with the proportioning drive, and in that a third switch switching off the electric motor is associated with the proportioning drive. The measures according to which the actuating rod comprises a first rod member coupled with the crank drive and a second rod member movable into engagement with the delivery piston, the two rod members being joined to each other with play in the direction of the central longitudinal axis, ensure that the delivery piston and the actuating rod are disengaged at the end of a delivery operation and prior to the opening of the inlet valve, and that the filling of the proportioning cylinder cannot be impeded by the proportioning drive. A possibility for the fine adjustment of the filling volume of the proportioning cylinder consists in that a switching sleeve adjustable in the direction of the central longitudinal axis is connected with the second rod member, the second switch being associated with the switching sleeve. A substantial modification of the filling volume of the proportioning cylinder is effected in that the crank drive has an exchangeable crank, and in that the crank drive has an exchangeable connecting link.

Further features, advantages and details of the invention will become apparent from the ensuing description of an exemplary embodiment, taken in conjunction with the drawing.

BRIEF DESCRIPTION OF THE DRAWING

FIG. 1 is a vertical longitudinal section of a proportioning apparatus, and

FIG. 2 is a partial lateral view of the proportioning apparatus according to the arrow II of FIG. 1.

DESCRIPTION OF THE PREFERRED EMBODIMENT

The proportioning apparatus illustrated in the drawing comprises a frame 1, which is mounted for instance on a machine frame 2. The proportioning apparatus comprises a proportioning device 3 which is operated by a proportioning drive 4.

The proportioning device 3 comprises a proportioning cylinder 5, in which a delivery piston 6 is disposed for displacement in the direction of a vertical central longitudinal axis 7 and sealed in relation to the cylinder 5. An inlet 8 of the proportioning cylinder 5 is connected to an arrangement (not shown) through which pasty material, for instance a sealing compound, is supplied under pressure. Arrangements of this type are known for instance from U.S. Pat. No. 3,738,400, to which reference is made. The pasty material is in place under permanent pressure at the inlet 8. The inlet 8 is closable by means of an inlet valve 9 which can be opened or closed by an inlet-valve actuation 10. An outlet 11 discharges from the proportioning cylinder 5 and can be opened and closed by an outlet valve 12 actuable by an outlet-valve actuation 13. A cartridge filling and sealing machine is connectable to the outlet 11; a machine of this type is known from U.S. Pat. No. 4,874,022, to which reference is made.

The proportioning drive 4 comprises an electric motor 14, which is a pole-changing braking motor of high starting torque. This motor 14 is provided with a reduction gear 15, to the driven shaft 16 of which the crank 17 of a crank drive 18 is fixed non-rotatably. The crank drive 18 is coupled with an actuating rod 19 that is in alignment with the axis 7. To this effect, the end of the actuating rod 19 adjacent to the drive 4 is provided with a recess 21 which extends transversely to the axis 7 and with which engages a crankshaft journal 22 fixed to the crank 17. In this oblong-hole-type recess 21, the crankshaft journal 22 is disposed without play in the direction of the axis 7, i.e. it is displaceable only transversely to the axis 7. The eccentricity a of the crankshaft journal 22 in relation to the driven shaft 16 is defined by the distance from center to center of the crankshaft journal 22 and the driven shaft 16. Consequently, the stroke of the actuating rod 19 is 2a. As seen in particular in FIG. 2, the connecting link 20 is screwed to the associated end of the actuating rod 19 by means of screws 23.

The actuating rod 19 consists of two rod members, namely a first rod member 24 which is associated with the proportioning drive 4 and a second rod member 25 which is associated with the proportioning cylinder 5. The first rod member 24 is run in a slide bearing 26 disposed on the frame 1 and is displaceable in the direction of the axis 7. The lower end, facing the second rod member 25, of the slide bearing 26 is provided with a stop 27. The first rod member 24 has a section of increased thickness 28, which is run in the slide bearing 26, and a section of reduced thickness 29, which faces the proportioning cylinder 5.

One end of the second rod member 25 bears freely against the delivery piston 6, i.e. the piston 6 is floatingly housed in the proportioning cylinder 6. The second rod member 25 and the delivery piston 6 are not tightly joined to each other. A pipe section 30 is detachably fastened by means of screws 31 to the other, upper end of the second rod member 25 and receives and encloses the section of reduced thickness 29 of the first rod member 24. This pipe section 30 has a rear recess 32 housing a driver 33 which is fixed to the free end of the section of reduced thickness 29 of the first rod member 24. The idle stroke, which the first rod member 24 can perform in relation to the second rod member 25, is defined by the clear length b of the rear recess 32. A switching sleeve 34 encircling the section of increased thickness 28 of the first rod member 24 is disposed on the pipe section 30 in close vicinity to the section of increased thickness 28 of the second rod member 25. This switching sleeve 34 is mounted on the pipe section 30 by means of a thread 35 so that the position of the edge 36, facing the slide bearing 26, of the switching sleeve 34 in relation to the first rod member 24 can be adjusted in the direction of the axis 7. A locknut 37 serves to secure such a position of the switching sleeve 34 relative to the pipe section 30. FIG. 1 illustrates how the first rod member 24 bears against the second rod member 25 directly by way of the disk-type driver 33.

The frame 1 is provided with three switches. A first switch 38 is associated with the second rod member 25. To this end, the second rod member 25, where passing into the pipe section 30, is provided with a switching element 39 which operates the first switch 38 when passing by the latter. A second switch 40 is associated with the switching sleeve 34 and will be actuated by a collar-type switching member 41 formed on the switching sleeve 34 when the latter passes by this switch 40. A third switch 42 is associated with the crank drive 18 and is actuated by a switching element 43 fixed to the connecting link 20.

The three switches 38, 40, 42 are connected via switching lines 44, 45, 46 to a central control unit 47, from which control lines 48, 49, 50 lead to the inlet-valve actuation 10, the outlet-valve actuation 13 and the electric motor 14.

The function of the proportioning apparatus is specified below, based on the position, illustrated in the drawing, of the individual parts of the apparatus:

The apparatus is at the end of the delivery process, in which the crank drive 18 is in its lower dead center; the delivery piston 6 has pushed out the material located in the proportioning cylinder 5. The inlet valve is still closed and the outlet valve 12 is still open. The first rod member 24 tightly bears against the second rod member 25.

By means of the first switch 38, the outlet valve 12 is closed, subsequent to which the inlet valve 9 is opened. The crank drive 18, which is still in rotation, revolves upwardly, taking along the first rod member 24. As a result of the play of the first rod member 24 and the second rod member 25 in the vicinity of the driver 33 and the rear recess 32, the second rod member 25 is not taken at first. In the course of the upward revolution of the crank drive 18, the second rod member 25 will also be taken along by way of the driver 33. As soon as the inlet valve 9 is opened, the material in place under pressure at the inlet 8 is forced into the proportioning cylinder 5, because it cannot flow off through the outlet 11. The delivery piston 6 is freely displaced in the proportioning cylinder 5, because the piston rod 19 and the its second rod member 25 have already been taken upwards by the crank drive 18.

When the crank drive 18 is in the upper dead center, the motor 14 is switched off, i.e. stopped, by the third switch 42 through the acuation of this third switch 42 by the switching member 43.

The filling of the proportioning cylinder 5 keeps on continuously until the switching member 41 of the switching sleeve 34 operates the second switch 40. At the end of this filling process, the edge 36 of the switching sleeve 34 comes to bear against the stop 27. The switch 40 is operated as the switching sleeve 34 is mechanically stopped. The switch 40 is accordingly located on the frame 1. By sequence control, the inlet valve is closed, the outlet valve 12 is opened and the motor 14 is started. Owing to the play between the first rod member 24 and the second rod member 25, the material starts to be pushed out of the proportioning cylinder 5, slightly lagging behind the start of the motor 14, i.e. not before the first rod member 24 and the second rod member 25 tightly rest on each other again—as seen in the drawing. At the end of the delivery process, the first switch 38 is operated by the switching member 39, whereby the outlet valve 12 is closed, the opening of the inlet valve 9 slightly lagging behind. The motor 14 keeps running, i.e. it does not stop in the lower dead center, and a new filling process starts as specified above.

By the switching sleeve 34 being displaced in relation to the pipe section 30, sensitive adjustment of the filling volume of the proportioning cylinder 5 can be achieved. If any substantial modifications of the filling volume, i.e. substantial modifications of the filling stroke of the delivery piston 6, are to be realized, then the crank 17 must be exchanged. In this case it is of use also to exchange the connecting link 20, in which case the recess 21 must be disposed such that, even with a modified stroke of the crank drive 18, the delivery piston 6 takes a position identical with its lower position shown in the drawing, i.e. the position of the delivery piston 6 at the lower dead center remains the same. Consequently, the stroke defined by the double eccentricity a should be modified only upwardly in relation to the proportioning cylinder 5.

What is claimed is:

1. A proportioning apparatus for viscous materials comprising:
   frame (1),
   a proportioning cylinder (5) mounted on the frame (1) and having an inlet (8) and an outlet (11) and a central longitudinal axis (7),
   a delivery piston (6) disposed in the proportioning cylinder (5) displaceably along said central longitudinal axis (7),
   an inlet valve (9) for closing and opening the inlet (8),
   an outlet valve (12) for closing and opening the outlet (11), a proportioning drive (4)

with an actuating rod (19) displaceable in the direction of the central longitudinal axis (7) and movable into delivering contact with the delivery piston (6), and with an electric motor (14) coupled with the actuating rod (19) by way of a crank drive (18).

2. A proportioning apparatus according to claim 1, wherein a first switch closing the outlet valve (12) and opening the inlet valve (9) is associated with the proportioning drive (4).

3. A proportioning apparatus according to claim 2, wherein a second switch (40) closing the inlet valve (9) and opening the outlet valve (12) is associated with the proportioning drive (4).

4. A proportioning apparatus according to claim 3, wherein a third switch (42) switching off the electric motor (14) is associated with the proportioning drive (4).

5. A proportioning apparatus according to claim 1, wherein the actuating rod (19) comprises a first rod member (24) coupled with the crank drive (18) and a second rod member (25) movable into engagement with the delivery piston (6), the first and second rod members (24, 25) being joined to each other with play in the direction of the central longitudinal axis (7).

6. A proportioning apparatus according to claim 5, wherein a first switch closing the outlet valve (12) and opening the inlet valve (9) is associated with the proportioning drive (4), wherein a second switch (40) closing the inlet valve (9) and opening the outlet valve (12) is associated with the proportioning drive (4), and wherein the first switch (38) and the second switch (40) are assorted with the second rod member (25).

7. A proportioning apparatus according to claim 6, wherein a switching sleeve (34) adjustable in the direction of the central longitudinal axis (7) is connected with the second rod member (25), the second switch (40) being associated with the switching sleeve (34).

8. A proportioning apparatus according to claim 1, wherein a third switch (42) switching off the electric motor (14) is associated with the proportioning drive (4), wherein the actuating rod (19) comprises a first rod member (24) coupled with the crank drive (18) and a second rod member (25) movable into engagement with the delivery piston (6), the first and second rod members (24, 25) being joined to each other with play in the direction of the central longitudinal axis (7), and wherein the third switch (42) is associated with the portion, comprising the crank drive (18) and the first rod member (24), of the proportioning drive (4).

9. A proportioning apparatus according to claim 1, wherein the crank drive (18) has an exchangeable crank (17).

10. A proportioning apparatus according to claim 1, wherein the crank drive (18) has an exchangeable connecting link (20).

* * * * *